United States Patent
Grant et al.

(10) Patent No.: US 8,825,516 B2
(45) Date of Patent: Sep. 2, 2014

(54) METHODS FOR CORRELATING FIRST MILE AND LAST MILE PRODUCT DATA

(75) Inventors: Elliott Grant, Woodside, CA (US); J. Scott Carr, Los Gatos, CA (US); Robert Herdemann, Loveland, OH (US)

(73) Assignee: YottaMark, Inc., Redwood City, CA (US)

( * ) Notice: Subject to any disclaimer, the term of this patent is extended or adjusted under 35 U.S.C. 154(b) by 559 days.

(21) Appl. No.: 12/908,667

(22) Filed: Oct. 20, 2010

(65) Prior Publication Data

US 2013/0346125 A1   Dec. 26, 2013

Related U.S. Application Data

(63) Continuation-in-part of application No. 12/206,156, filed on Sep. 8, 2008, now Pat. No. 7,909,239.

(60) Provisional application No. 60/970,933, filed on Sep. 7, 2007.

(51) Int. Cl.
*G06Q 10/00* (2012.01)

(52) U.S. Cl.
USPC ............. 705/7.41; 705/28; 705/304; 235/385

(58) Field of Classification Search
CPC .......... G06Q 10/06395; G06Q 10/063; G06Q 10/06; G06Q 10/0639; G06Q 10/06393
USPC ..................... 705/7.41, 28, 333, 317; 235/385
See application file for complete search history.

(56) References Cited

U.S. PATENT DOCUMENTS

| | | | |
|---|---|---|---|
| 3,329,181 A | 7/1967 | Buss | |
| 4,385,482 A | 5/1983 | Booth | |

(Continued)

FOREIGN PATENT DOCUMENTS

| | | |
|---|---|---|
| CN | 1350265 A | 5/2002 |
| JP | 2000011114 A2 | 1/2000 |

(Continued)

OTHER PUBLICATIONS

Ilic, A. et al., "The Value of Sensor Information for the Management of Perishable Goods—A Simulation Study" (Jun. 4, 2008), Accessed from: http://www.im.ethz.ch/publications/ilic_voi_perishables_perceived_quality_0608.pdf.*

(Continued)

*Primary Examiner* — Tiphany Dickerson
(74) *Attorney, Agent, or Firm* — Peters Verny, LLP

(57) ABSTRACT

Traceability codes on perishable products facilitate the correlation of product data from the origin of a distribution chain to quality assessments of the perishable products made at points along the distribution chain. The product data is initially associated with the code, the product is marked with the code, and then the product is distributed. Receipt of a code after the perishable product enters the distribution chain establishes an elapsed time. Location information submitted with the code can also establish a traversed distance. A quality assessment submitted with the code can be associated with both time and distance. Consumers, for example, may submit codes, provide assessments and locations, and in return access product data linked to the specific products they consider in retail stores, purchase, and use. Inspectors can likewise submit quality assessments from locations earlier in the distribution chain as well as in retail stores.

4 Claims, 5 Drawing Sheets

(56) References Cited

U.S. PATENT DOCUMENTS

| | | |
|---|---|---|
| 4,526,404 A | 7/1985 | Vazquez |
| 4,544,590 A | 10/1985 | Egan |
| 4,832,204 A | 5/1989 | Handy et al. |
| 4,846,504 A | 7/1989 | MacGregor et al. |
| 5,136,826 A | 8/1992 | Carson et al. |
| 5,271,642 A | 12/1993 | Jahier et al. |
| 5,343,529 A | 8/1994 | Goldfine et al. |
| 5,360,628 A | 11/1994 | Butland |
| 5,361,904 A | 11/1994 | Kapec et al. |
| 5,478,990 A | 12/1995 | Montanari et al. |
| 5,486,686 A | 1/1996 | Zydbel, Jr. et al. |
| 5,561,970 A | 10/1996 | Edie et al. |
| 5,569,317 A | 10/1996 | Sarada et al. |
| 5,592,561 A | 1/1997 | Moore |
| 5,611,948 A | 3/1997 | Hawkins |
| 5,619,416 A | 4/1997 | Kosarew |
| 5,668,803 A | 9/1997 | Tymes et al. |
| 5,695,071 A | 12/1997 | Ross et al. |
| 5,768,384 A | 6/1998 | Berson |
| 5,793,030 A | 8/1998 | Kelly, Jr. |
| 5,895,073 A | 4/1999 | Moore |
| 5,917,925 A | 6/1999 | Moore |
| 6,005,960 A | 12/1999 | Moore |
| 6,041,929 A | 3/2000 | Brunner et al. |
| 6,069,955 A | 5/2000 | Coppersmith et al. |
| 6,203,069 B1 | 3/2001 | Outwater et al. |
| 6,211,789 B1 | 4/2001 | Oldham et al. |
| 6,212,638 B1 | 4/2001 | Lee et al. |
| 6,226,619 B1 | 5/2001 | Halperin et al. |
| 6,231,435 B1 | 5/2001 | Pilger |
| 6,246,778 B1 | 6/2001 | Moore |
| 6,297,508 B1 | 10/2001 | Barmore et al. |
| 6,308,165 B1 | 10/2001 | Gilham |
| 6,314,337 B1 | 11/2001 | Marcum |
| 6,329,920 B1 | 12/2001 | Morrison et al. |
| 6,342,839 B1 | 1/2002 | Curkendall et al. |
| 6,346,885 B1 | 2/2002 | Curkendall |
| 6,349,292 B1 | 2/2002 | Sutherland et al. |
| 6,361,079 B1 | 3/2002 | Kirkman |
| 6,363,483 B1 | 3/2002 | Keshav |
| 6,364,990 B1 | 4/2002 | Grosskopf et al. |
| 6,398,106 B1 | 6/2002 | Ulvr et al. |
| 6,409,082 B1 | 6/2002 | Davis et al. |
| 6,428,640 B1 | 8/2002 | Stevens et al. |
| 6,442,276 B1 | 8/2002 | Doljack |
| 6,456,729 B1 | 9/2002 | Moore |
| 6,473,739 B1 | 10/2002 | Showghi et al. |
| 6,536,672 B1 | 3/2003 | Outwater |
| 6,547,137 B1 | 4/2003 | Begelfer et al. |
| 6,591,252 B1 | 7/2003 | Young |
| 6,612,494 B1 | 9/2003 | Outwater |
| 6,664,897 B2 | 12/2003 | Pape et al. |
| 6,680,783 B1 | 1/2004 | Pierce et al. |
| 6,766,324 B2 | 7/2004 | Carlson et al. |
| 6,788,800 B1 | 9/2004 | Carr et al. |
| 6,796,504 B2 | 9/2004 | Robinson |
| 6,805,926 B2 | 10/2004 | Cote et al. |
| 6,806,478 B1 | 10/2004 | Hatfield |
| 6,808,574 B1 | 10/2004 | Stevens et al. |
| 6,859,672 B2 | 2/2005 | Roberts et al. |
| 6,974,298 B2 | 12/2005 | Tanaka |
| 6,991,261 B2 | 1/2006 | Dronzek, Jr. et al. |
| 6,995,675 B2 | 2/2006 | Curkendall et al. |
| 7,013,286 B1 | 3/2006 | Aggarwal et al. |
| 7,040,532 B1 | 5/2006 | Taylor et al. |
| 7,043,442 B2 * | 5/2006 | Levy et al. ............... 705/346 |
| 7,207,481 B2 | 4/2007 | Barenburg et al. |
| 7,211,163 B2 | 5/2007 | Kennedy |
| 7,222,791 B2 | 5/2007 | Heilper et al. |
| 7,261,235 B2 | 8/2007 | Barenburg et al. |
| 7,277,601 B2 | 10/2007 | Zorab et al. |
| 7,283,630 B1 | 10/2007 | Doljack |
| 7,295,114 B1 | 11/2007 | Drzaic et al. |
| 7,321,310 B2 | 1/2008 | Curkendall et al. |
| 7,412,461 B2 | 8/2008 | Sholl et al. |
| 7,519,825 B2 | 4/2009 | Geoffrey |
| 7,680,691 B2 * | 3/2010 | Kimball et al. ................. 705/22 |
| 7,686,513 B2 | 3/2010 | Knoerzer et al. |
| 7,705,735 B2 | 4/2010 | Pape et al. |
| 7,714,729 B2 | 5/2010 | Pape et al. |
| 7,766,240 B1 | 8/2010 | Grant |
| 7,810,726 B2 | 10/2010 | de la Huerga |
| 7,827,058 B2 | 11/2010 | Mortimer |
| 7,909,239 B2 | 3/2011 | Grant et al. |
| 8,019,662 B2 * | 9/2011 | Lucas ............................ 705/28 |
| 8,152,063 B1 | 4/2012 | Grant |
| 8,155,313 B2 | 4/2012 | Grant |
| 2001/0056359 A1 | 12/2001 | Abreu |
| 2002/0004767 A1 | 1/2002 | Okamoto et al. |
| 2002/0131442 A1 | 9/2002 | Garg et al. |
| 2002/0158765 A1 | 10/2002 | Pape et al. |
| 2002/0178363 A1 | 11/2002 | Ambrogio et al. |
| 2003/0019186 A1 | 1/2003 | Hakansson |
| 2003/0080191 A1 | 5/2003 | Lubow et al. |
| 2003/0089078 A1 | 5/2003 | Christina |
| 2003/0177025 A1 | 9/2003 | Curkendall et al. |
| 2003/0177095 A1 | 9/2003 | Zorab et al. |
| 2003/0185948 A1 | 10/2003 | Garwood |
| 2003/0221108 A1 | 11/2003 | Rupp |
| 2004/0065053 A1 | 4/2004 | Rice et al. |
| 2004/0159527 A1 | 8/2004 | Williamson |
| 2004/0200892 A1 | 10/2004 | Curkendall et al. |
| 2004/0205343 A1 | 10/2004 | Forth et al. |
| 2004/0230796 A1 | 11/2004 | Lundvall et al. |
| 2005/0004682 A1 | 1/2005 | Gaddis et al. |
| 2005/0038756 A1 | 2/2005 | Nagel |
| 2005/0075900 A1 | 4/2005 | Arguimbau, III |
| 2005/0097054 A1 | 5/2005 | Dillon |
| 2005/0108044 A1 | 5/2005 | Koster |
| 2005/0182695 A1 | 8/2005 | Lubow et al. |
| 2005/0206586 A1 | 9/2005 | Capurso et al. |
| 2005/0247778 A1 | 11/2005 | Roberts |
| 2005/0251449 A1 | 11/2005 | Pape et al. |
| 2005/0288947 A1 | 12/2005 | Mallonee et al. |
| 2006/0004907 A1 | 1/2006 | Pape et al. |
| 2006/0022059 A1 | 2/2006 | Juds |
| 2006/0054682 A1 | 3/2006 | de la Huerga et al. |
| 2006/0100964 A1 | 5/2006 | Wilde et al. |
| 2006/0111845 A1 | 5/2006 | Forbis et al. |
| 2006/0161443 A1 | 7/2006 | Rollins |
| 2006/0180661 A1 | 8/2006 | Grant et al. |
| 2006/0187048 A1 | 8/2006 | Curkendall et al. |
| 2006/0201432 A1 * | 9/2006 | Pratt ........................ 119/51.02 |
| 2006/0259182 A1 | 11/2006 | Mantell |
| 2006/0260495 A1 | 11/2006 | Siedlaczek |
| 2006/0289654 A1 * | 12/2006 | Robinson et al. ........ 235/462.46 |
| 2007/0001006 A1 | 1/2007 | Schuessler et al. |
| 2007/0051362 A1 | 3/2007 | Sullivan et al. |
| 2007/0119954 A1 | 5/2007 | Barenburg et al. |
| 2007/0119955 A1 | 5/2007 | Barenburg et al. |
| 2007/0170240 A1 | 7/2007 | Grant et al. |
| 2007/0175974 A1 | 8/2007 | Self et al. |
| 2007/0203724 A1 | 8/2007 | Farmer et al. |
| 2007/0203818 A1 | 8/2007 | Farmer et al. |
| 2007/0205258 A1 | 9/2007 | Self et al. |
| 2007/0219916 A1 | 9/2007 | Lucas |
| 2008/0011841 A1 | 1/2008 | Self et al. |
| 2008/0011843 A1 | 1/2008 | Barenburg et al. |
| 2008/0023472 A1 | 1/2008 | Brandt |
| 2008/0030348 A1 | 2/2008 | Pape et al. |
| 2008/0046263 A1 | 2/2008 | Sager et al. |
| 2008/0143094 A1 | 6/2008 | Goetz |
| 2008/0178197 A1 | 7/2008 | Pape et al. |
| 2008/0215484 A1 | 9/2008 | Oldham et al. |
| 2009/0065579 A1 * | 3/2009 | Grant et al. .................... 235/385 |
| 2009/0242631 A1 | 10/2009 | Wishnatzki et al. ........... 235/385 |
| 2010/0106660 A1 | 4/2010 | Farmer et al. |
| 2010/0112680 A1 * | 5/2010 | Brockwell et al. ......... 435/287.9 |
| 2010/0145730 A1 * | 6/2010 | Abreu ............................. 705/3 |
| 2011/0035326 A1 * | 2/2011 | Sholl et al. .................... 705/317 |
| 2012/0037697 A1 | 2/2012 | Boone et al. |
| 2012/0084119 A1 * | 4/2012 | Vandehey et al. ............ 705/7.31 |

(56) References Cited

U.S. PATENT DOCUMENTS

FOREIGN PATENT DOCUMENTS

| JP | 2002140449 | A2 | 5/2002 |
|---|---|---|---|
| WO | 03007252 | A1 | 1/2003 |
| WO | 2006084090 | A2 | 8/2006 |
| WO | 2007140018 | A2 | 6/2007 |

OTHER PUBLICATIONS

Roberti, M., "RFID Will Help Keep Perishables Fresh" (Aug. 3, 2005), RFID Journal, Accessed from: www.rfidjournal.com/article/view/1775.*
Grant, E., "Traceability: Giving every product an authentic identity" Jun. 2008, PackagePrinting, vol. 55, Iss. 6, pp. 30-33.*
YottaMark, Inc., YottaMark Launches HarvertMark for Cases, Aug. 2008, Gastoenterology Week, 676, http://search.proquest.com/docview/237361750?accountid=14753.*
PCT/US08/75626 International Search Report and Written Opinion, Nov. 26, 2008.
PCT/US06/03768 International Search Report and Written Opinion, Jun. 12, 2008.
Secure Symbology, Inc. Business Overview, May 2008.
Paul Chang, IBM Industry Forum 2010, Mexico Industry Event, 2010.
"CRC: Implementation," http://www.relisoft.com/science/CrcNaive.html, 2006.
Yoichi Shibata et al., "Mechanism-based PKI," Computer System Symposium 2003, vol. 2003 (15), pp. 181-186, (1998).
U.S. Appl. No. 12/359,151, Elliott Grant, Adding Traceability Codes to Produce Labels without Increasing the Size thereof, filed Jan. 23, 2009.
U.S. Appl. No. 12/370,346, J. Scott Carr, Systems and Methods of Associating Individual Packages with Harvest Crates, filed Feb. 12, 2009.
U.S. Appl. No. 12/501,240, Elliott Grant, Mobile Table for Implementing Clamshell-to-Case Association, filed Jul. 10, 2009.
U.S. Appl. No. 12/143,016, Elliott Grant, Duo Codes for Product Authentication, filed Jun. 20, 2008.
U.S. Appl. No. 13/431,983, Elliott Grant, Mobile Table for Implementing Clamshell-to-Case Association, filed Mar. 28, 2012.
U.S. Appl. No. 13/053,200, Elliott Grant, Attributing Harvest Information with Unique Identifiers, filed Mar. 21, 2011.
U.S. Appl. No. 12/580,506, Elliott Grant, Method and System for Deterring Product Counterfeiting, Diversion and Piracy, filed Oct. 16, 2009.
U.S. Appl. No. 13/004,173, Elliott Grant, Systems and Methods for using a Search Engine to Implement Product Traceability, filed Jan. 11, 2011.
U.S. Appl. No. 13/034,208, Elliott Grant, Methods for Assigning Traceability Information to and Retrieving Traceability Information from a Store Shelf, filed Feb. 24, 2011.
U.S. Appl. No. 12/877,467, Elliott Grant, Lot Identification Codes for Packaging, filed Sep. 8, 2010.
U.S. Appl. No. 12/850,909, Elliott Grant, Method and System for Deterring Product Counterfeiting, Diversion and Piracy filed Aug. 5, 2010.
U.S. Appl. No. 12/689,949, Elliott Grant, Voice Code with Primary and Secondary Digits, filed Jan. 19, 2010.
U.S. Appl. No. 13/221,520, Elliott Grant, Case Labeling for Field-Packed Produce, filed Aug. 30, 2011.
U.S. Appl. No. 12/576,092, Elliott Grant, Voice Code for Distribution Centers, filed Oct. 8, 2009.
U.S. Appl. No. 13/449,145, Elliott Grant, Case Labeling for Field-Packed Produce, filed Apr. 17, 2012.

* cited by examiner

METHODS FOR CORRELATING FIRST MILE AND LAST MILE PRODUCT DATA

This application is a continuation-in-part of U.S. application Ser. No. 12/206,156 filed Sep. 8, 2008, now U.S. Pat. No. 7,909,239, entitled "Attributing Harvest Information with Unique Identifiers."

BACKGROUND OF THE INVENTION

1. Field of the Invention

The present invention relates to the field of perishable consumer goods and more particularly to correlating quality of such goods at the end of the distribution chain to conditions existing at the beginning and along the distribution chain.

2. Description of the Prior Art

Perishable products, such as fresh meats, dairy, baked goods, and produce, degrade in quality rapidly, and a significant amount of perishable foods go to waste before they can be consumed.

SUMMARY

The present invention provides methods for linking quality assessments of perishable products back to lot-specific product data. An exemplary method comprises receiving a traceability code in association with lot-specific product data including a first time and a first location, and storing the lot-specific product data in association with the traceability code. The method further comprises receiving the traceability code at a second time, receiving a quality assessment about a product contemporaneously with receiving the traceability code, and storing the quality assessment in association with the traceability code. The method further comprises determining an elapsed time between the second time and the first time and associating the elapsed time with the quality assessment. In various embodiments, receiving the quality assessment includes accessing a record associated with the traceability code to determine non-lot-specific product data that identifies a type of perishable product, and then sending a grading scale for the type of perishable product. Receiving the quality assessment may include receiving location information contemporaneously with receiving the quality assessment, and some of these embodiments may further comprise determining a traversed distance between the first location and a second location. Here, the second location is either the same as the location information (e.g., a postal address or geo-location coordinates) or is can be found from the location information (e.g., where the location information comprises a code to identify a particular store, the second location can be the postal address found by looking up the store code). Also, in some embodiments where receiving the quality assessment includes receiving location information, these embodiments include storing the second location in association with the quality assessment and the traceability code. The method optionally further comprises sending at least some of the lot-specific product data in response to receiving the traceability code at the second time.

Another exemplary method for linking quality assessments of perishable products back to lot-specific product data also comprises receiving a traceability code in association with lot-specific product data including a first time and a first location, and storing the lot-specific product data in association with the traceability code. However, this exemplary method further comprises receiving the traceability code in association with a second time, a quality assessment, and optional location information. In the prior exemplary method, the traceability code is received at the second time typically from a source, such as a PC or smartphone, that does not provide a timestamp with the traceability code, so the association to the time of receipt of the traceability code is made by the computing system that receives the traceability code. In the present exemplary method, the source of the traceability code is typically a portable device with internal memory that stores each scanned traceability code in association with the time of the scan. The results of many such associations can be later uploaded, wherein the present exemplary method receives the traceability code a subsequent time. That traceability code is then stored in association with the quality assessment. A time difference can also be determined between the second time and the first time and further associated with the quality assessment. A traversed distance can also be determined based on the first location and the second location information, and then stored in association with the quality assessment and the traceability code.

Further methods of the invention utilize the stored associations between quality assessments, elapsed times, traversed distances, and lot-specific product data to illustrate statistically significant relationships between various variables that can be of value to both perishable product producers and/or retailers. These relationships can be displayed as graphs, maps, and so forth.

The present invention also provides a hand-held device for gathering traceability codes and quality assessments. An exemplary such device comprises a housing including a hand grip and trigger, a bar code reader configured to be activated by the trigger, a touchscreen display disposed on the housing, and optionally a digital camera. The device further comprises a communication interface and logic both within the housing. The logic is configured to receive a scanned traceability code from the bar code reader, determine the location of the device, receive a first user input from the touchscreen display, and send the traceability code in association with the location and the first user input through the communication interface. Here, the first user input can be a selection from a grading scale displayed on the touchscreen, for example. The logic, in some embodiments, is also configured to receive a second user input from the touchscreen, such as a UPC code, and in response display a grading scale for a perishable product on the touchscreen.

DETAILED DESCRIPTION OF THE INVENTION

Figure 1:
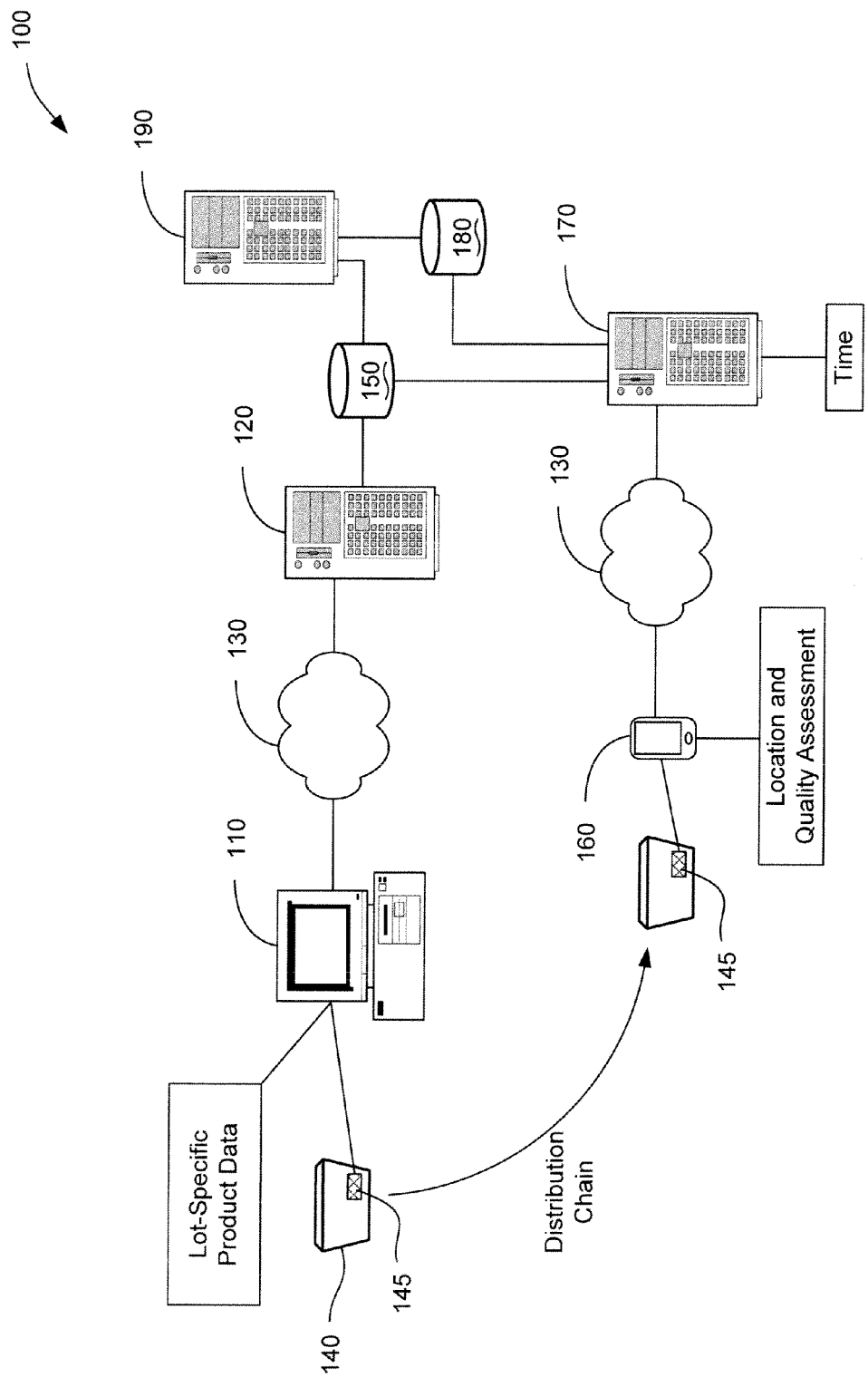
FIG. 1 is a system for using traceability codes to link quality assessments of perishable products back to lot-specific product data according to an exemplary embodiment of the present invention.

The present invention is directed to methods of using traceability codes on perishable products to facilitate the two-way exchange of information between consumers, and others, and the producers of the perishable products. Consumers use the traceability codes to easily access lot-specific information about the perishable products they are buying, or have bought. In the case of fresh produce this can mean receiving information about where the produce was grown, down to a specific field in some instances, the date of harvest, whether that particular produce is subject to a recall, and so forth. The consumer, in turn, is able to provide valuable feedback regarding the quality of the perishable products at the time of sale and beyond that can be linked to the submitted traceability code. The traceability code allows quality assessments of perishable products, collected at known locations and times, to be correlated to lot-specific product data such as the time and location of origination of the lot.

Lot-specific product data that is of interest to consumers, such as the examples given above, are referred to herein as consumer-oriented lot-specific product data. Lot-specific product data that would not typically be released to consumers but that would be primarily of value to the producers of perishable products are referred to herein as producer-oriented lot-specific product data and can include, for fresh produce, the variety planted, the temperature during the harvest, number of days from planting until harvest, types and quantities of nutrients and pesticides, time from field to packaging, and the like. Non-lot-specific product data can also be stored in association with traceability codes and provided to requestors in certain instances. Examples of non-lot-specific product data include brand names, package sizes, general images of the perishable product 140, and so forth.

As noted, each traceability code is associated with an origination time and location, and the time that a traceability code is later submitted establishes a second time. Location information can also be associated with the second time in various ways. This establishes an elapsed time, and optionally a traversed distance, from the time and the location first associated with the traceability code to the time and the location where the perishable product was subsequently evaluated. The quality assessment from the consumer is further associated with the traceability code. Over time, enough information is collected that the feedback becomes significant to the producers of the perishable products.

Accordingly, even though the number of samples for a single lot may lack significance, continuous collection of data over multiple lots can reveal patterns. These patterns can reveal, for example, that a perishable product within a certain region is consistently judged to have a lower quality as compared to perishable products in other regions after the same number of days, suggesting a problem somewhere along the distribution chain to the low-scoring region, such as improper refrigeration at some point. The assessed quality can also be correlated to other producer-oriented lot-specific product data such as the variety or supplier of the seed. Assessments over multiple lots can reveal that one varietal is preferred by consumers over another, for instance.

In addition to consumers, others along the distribution chain can also provide quality assessments. Here, too, traceability codes facilitate either a one-way or a two-way exchange of information. In various embodiments quality assessments are made by independent inspectors situated in retail stores and elsewhere along the distribution chain, and/or by employees of the warehouses, of the shipping contractors, and of the retail stores or restaurants, for example. In some instances, such as in the case of an inspector, the person making the quality assessment does not need to receive lot-specific information as an enticement to provide the quality assessment. Accordingly, there may be only a one-way flow of information from the person making the quality assessment. In these instances the person making the quality assessment may simply scan traceability codes on perishable products and then grade the product. Returning lot-specific product data remains optional, however, even where there is typically only one-way flow of information.

FIG. 1 illustrates an exemplary system 100 of the present invention. System 100 comprises a client computing system 110 in communication with a host computing system 120 across a network 130 comprising, for example, a Local Area Network (LAN), a Wide Area Network (WAN), a public switched telephone network (PSTN), a 3G network, or the Internet. The client computing system 110 can be located at the beginning of a distribution chain for a perishable product 140. As used herein, a perishable product 140 is a commodity characterized by one or more qualities that degrade over a distribution time, defined as the time between the commodity's production and the time at which the commodity is made available for retail purchase. Examples of qualities that may degrade include appearance, smell, taste, texture, and efficacy. Examples of perishable products 140 include fresh produce, baked goods, dairy products, packaged meats, and some pharmaceuticals and personal care products. For the purposes of the present invention, a commodity that is not characterized by a quality that degrades over a distribution time of less than a month is not a perishable product 140.

At the beginning of the distribution chain, a supplier such as a grower, dairy, bakery, packager, or manufacturer associates lot-specific product data with one or more traceability codes 145 and marks the traceability codes 145 on perishable products 140. Traceability codes 145 can be printed on packaging, printed on labels that are applied to packaging or applied directly to the perishable product 140, written to an RFID tag that is applied in the same manner as the label, and so forth. Traceability codes 145 can also be marked on cases in addition, or in the alternative to, marking individual perishable product 140.

A lot, as used in the art and herein, refers to a quantity of a product produced under essentially the same conditions, and is intended to have uniform quality and characteristics. The Lot-specific product data can comprise both consumer-oriented and producer-oriented product data. Lot-specific product data in the context of fresh produce can include harvest data such as the identity or location of a ranch or farm, the field and section harvested, the crew performing the harvesting, harvest time and date, the weather conditions, brand name, seed variety, special notes, and so forth. Such lot-specific product data is sometimes referred to as pertaining to the "first mile" of the distribution chain. Although not illustrated in FIG. 1, the associations between the traceability codes 145 and the lot-specific product data can be stored locally by the client computing system 110, for example, in a computer-readable memory device (not shown).

Some exemplary methods for associating lot-specific product data with traceability codes 145 are disclosed in U.S. patent application Ser. No. 12/206,156 filed on Sep. 8, 2008 and entitled "Attributing Harvest Information with Unique Identifiers." Traceability codes 145 are also discussed in greater detail in U.S. patent application Ser. No. 12/206,156 as well as in U.S. patent application Ser. No. 11/619,747 filed on Jan. 4, 2007 and entitled "System and Method of Code Generation and Authentication," in U.S. patent application Ser. No. 11/347,424 filed on Feb. 2, 2006 and entitled "Method and System for Deterring Product Counterfeiting, Diversion and Piracy," and in U.S. patent application Ser. No. 12/877,467 filed on Sep. 8, 2010 and entitled "Lot Identification Codes for Packaging," all of which are incorporated herein by reference. Traceability codes 145 can be marked on the perishable product 140 in a human-readable format like a string of digits, either numeric or alphanumeric, and/or in a machine-readable format such as a barcode, 2D DataMatrix, or encoded in an RFID tag.

With continued reference to FIG. 1, the client computing system 110 sends the lot-specific product data in association with the one or more traceability codes 145 to the host computing system 120. In some instances, the lot-specific product data includes a first location and a first time, such as a harvest or packing date. In various embodiments, the first location can be represented by an identifier such as for a ranch, farm, field or section of a field, packing or processing facility, or can be represented by a postal address or geo-location coordinates. The first time and first location together define an origin for the lot that can be used in later analyses to correlate the elapsed time and/or traversed distance to quality assessments. Other lot-specific product data can also be later correlated to subsequent quality assessments as a function of the time or the distance from the origin, as discussed further herein.

The host computing system 120 receives and stores the lot-specific product data in association with the one or more traceability codes 145 in a computer-readable memory device 150. Exemplary computer-readable memory devices 150 can comprise magnetic or optical mass storage devices, for example. Neither paper nor carrier waves constitute a computer-readable memory device 150, as the term is used herein.

The perishable products 140 next enter a distribution chain, typically comprising modes of transportation and intermediate destinations, to reach retail distributors and consumers. Further product data can be determined at points along the distribution chain, such as the temperature profile within a refrigerated truck, and associated with the traceability code 145. The associations between the traceability code 145 and the further product data can be stored locally in a computer-readable memory device and/or can be stored in the computer-readable memory device 150 in further association with the lot-specific product data for that traceability code 145. The further product data can be sent to the host computing system 120 or some other computing system (not shown) in communication with the computer-readable memory device 150 to store the further product data. The further product data is viewed herein as lot-specific product data even when it is pertinent to only a segment of the overall lot.

Additionally, at points along the distribution chain, including at the retail distributor and at points of use or consumption such as restaurants and homes, the traceability code 145 can be used to retrieve lot-specific product data from the computer-readable memory device 150. In various embodiments this is accomplished by accessing the computer-readable memory device 150 through a computing device 170. In various embodiments the computing device 170 is the same computing device as the host computing device 120, or a completely separate computing device.

A requestor, such as a consumer, a wholesaler, a retailer, or a public or private inspector can request the lot-specific product data from the computing device 170 in a number of ways. For example, the requestor can call a phone number to reach an automated service through which the traceability code 145 can be manually entered or voice-entered, and phone menus can be used to navigate to various lot-specific product data. As another example, the requestor can employ a communication device 160, including a browser application and a communications interface to a network 130, to access a website through which the traceability code 145 can be manually entered or voice-entered into a request page. A results page with lot-specific product data can then be served to the requestor. In various embodiments, the communication device 160 may be a personal computer (PC), smartphone, hand-held scanner, or the like.

Figure 2:
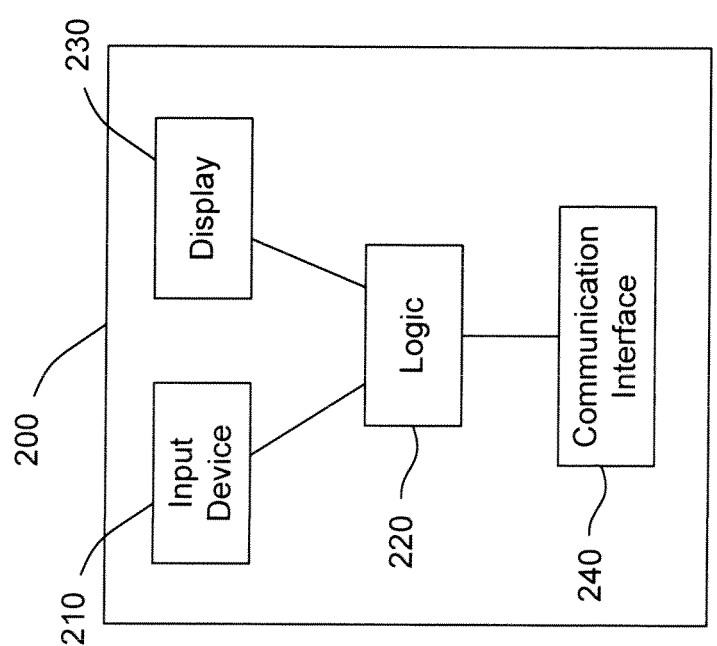
FIG. 2 is a schematic representation of a communication device for providing quality assessments according to an exemplary embodiment of the present invention.

FIG. 2 schematically represents a communication device 200 as an example of communication device 160. Communication device 200 may be a smartphone or another hand-held device such as the hand-held device 300 of FIG. 3, discussed in greater detail below. Communication device 200 comprises an input device 210, logic 220, a display 230, and a communication interface 240. The input device 210 is used to read traceability codes 145, automating the input of traceability codes 145 and eliminating errors associated with manual and voice entry. Examples of input devices 210 include digital cameras and bar code scanners. The logic 220 can comprise hardware, firmware, software or a combination thereof. The display 230 can be touch-sensitive in some embodiments. The communication interface 240 can comprise, for instance, a wireless interface such as a 3G, 4G, or WiFi interface, or can comprise a wired interface such as a USB port.

Where the communication device 200 comprises a smartphone, for example, the input device 210 can be a digital camera while the logic 220 includes a processor and a memory storing an application configured to perform an image analysis to recognize and interpret strings of digits and/or bar codes. Where the communication device 200 comprises the hand-held device 300 of FIG. 3 the input device 210 can be a bar code reader.

In some embodiments, the logic 220 is configured to recognize traceability codes 145, such as by the number of digits as described in U.S. patent application Ser. No. 12/877,467. The logic 220 may be further configured to automatically connect to an appropriate website and submit the scanned traceability code 145. In still further embodiments the logic 220 may be configured to receive from the website lot-specific product data and display the same. The requestor merely scans the traceability code 145 to receive the lot-specific product data, in these embodiments.

In various embodiments the logic 220 is additionally configured to determine a geo-location, utilizing cellphone tower triangulation or GPS signals, for example. This allows the requestor to provide location information in the form of latitude-longitude coordinates to the computing device 170 to be associated with the traceability code 145 for use in later analyses. Optionally, the requestor can provide location information such as a zip code or a postal address to the computing device 170 automatically or through manual entry, such as through a keyboard or touchscreen display 230, or voice interface of the communication device 200. As an example of providing the location information automatically, a smartphone can run an application configured to recognize traceability codes 145 and automatically determine the geo-location, connect through the communication interface 240 to an appropriate website, and submit the scanned traceability code 145 in association with the geo-location.

Figure 3:
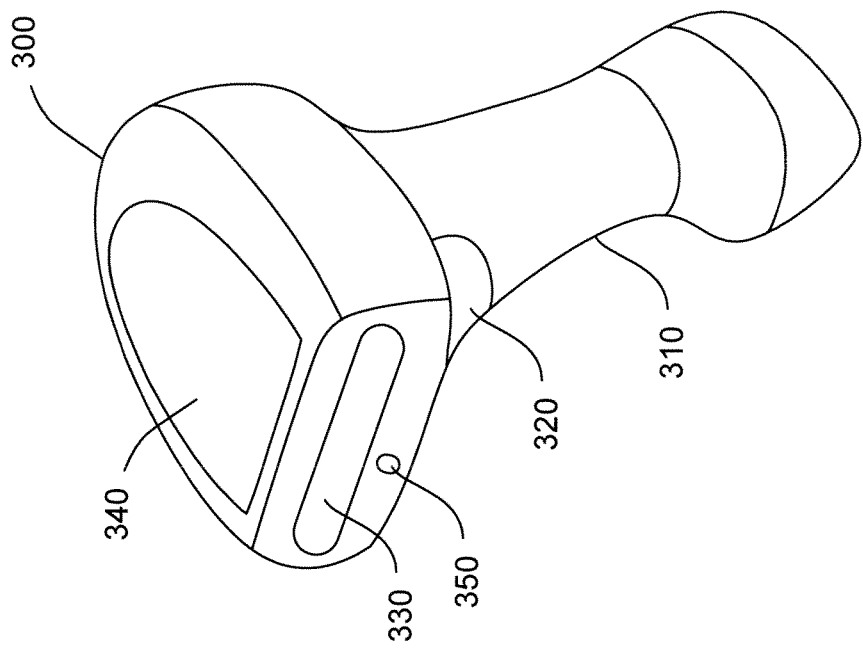
FIG. 3 is a perspective view of a hand-held communication device for providing quality assessments according to an exemplary embodiment of the present invention.

FIG. 3 is a perspective view of an exemplary hand-held device 300 to be used to provide quality assessments of perishable products 140 in retail stores and elsewhere in the distribution chain. The device 300 can be used by quality inspectors, for example, to conveniently scan traceability codes 145 and enter quality assessments to be communicated to the computing device 170. The device 300 comprises a housing having a hand grip 310 including a trigger 320. The housing also includes a bar code reader 330, configured to be activated by the trigger 320, and a display 340, such as a touchscreen. Optionally, the device 300 may comprise a digital camera 350. The device 300 further comprises, disposed within the housing and not shown in FIG. 3, a power source, such as a battery, and logic 220 in communication with a communication interface 240. The logic 220 is in further communication with the trigger 320, bar code reader 330, display 340, and optional camera 350. Activating the trigger 320 causes the bar code reader 330 to scan for a bar code. A successful read can be indicated audibly and/or visually on the display 340. In alternative embodiments, the device 300 includes an RFID reader in place of the bar code reader 330. The logic 220 of the device 300 can prevent the user from entering the same traceability code 145 more than once, in some embodiments, to prevent the user from falsifying check data.

In some embodiments of the device 300 the logic 220 is configured to automatically communicate a traceability code 145 and location information, for each read, through the communication interface 240 to a computing device 170 essentially in real-time. In some of these embodiments the device 300 can also receive from the computing device 170 through the communication interface 240 in response to communicating the read. For instance, if the computing device 170 determines from the traceability code 145 that the perishable product 140 is bananas, then the computing device 170 can provide a grading scale to the device 300 to be shown on the display 340. The grading scale can comprise a series of images, for example, and where the display 340 is a touchscreen, the inspector can touch the display 340 to select an image that best matches the perishable product 140. The quality assessment is then communicated back to the computing device 170. Similarly, the computing device 170 can send instructions to the device 300 such as to the requestor to grade more examples of the perishable product 140 or to take a picture of the perishable product 140 with the camera 350.

In alternative embodiments the device 300 is not configured to communicate in real-time with the computing device 170 but instead includes memory such as RAM and is configured to store each traceability code 145 that is read by the bar code reader 330. In these embodiments, the user of the device 300 may be prompted by a message displayed on the display 340 by the logic 220 to enter product identification data such as a UPC code from the perishable product 140. The product identification data tells the logic 220 what perishable product 140 is being evaluated, and therefore the logic 220 can provide the user with an appropriate grading scale after the traceability code 145 has been read. In some instances, once product identification data has been entered every traceability code 145 scanned thereafter is associated with that product identification until a new product identification is entered. In other instances the user enters product identification data with each read. As in the examples above, location information is associated with the traceability codes 145 that are stored, either by associating location information individually with each traceability code 145, or by associating location information with a set of traceability codes 145. Also, in these embodiments, the device 300 can associate a time with each traceability code 145 that is read. Accumulated data associating traceability codes 145 with quality assessments, times, and location information can be subsequently uploaded to the computing device 170 through the communication interface 240.

With renewed reference to FIG. 1, in those embodiments where the communication device 160 communicates in real-time with the computing device 170, the computing device 170 receives the traceability code 145 and associates the traceability code 145 with the time of receipt. In those instances where the location information is provided automatically with the traceability code 145, the computing device 170 receives location information together with the traceability code 145 and associates both together with the time of receipt. In those embodiments where the communication device 160 comprises a kiosk, the kiosk can be configured to provide to the computing device 170 an identifying code specific to that kiosk with each scan of a traceability code 145, such that the identifying code constitutes location information. It will be appreciated, therefore, that in some instances the location information will be highly specific, such as latitude-longitude coordinates or a street address, while in other embodiments the location information will be less specific, such as a zip code or city. Further, in some embodiments the location information does not itself comprise a location but is an identifier associated with a location, such as the identifying code for the kiosk in the above example.

In those embodiments where the location information is not provided automatically the computing device 170 first receives the traceability code 145 and associates the time of receipt therewith. Next, the computing device 170 responds to the receipt of the traceability code 145 and the response can prompt the requestor for location information. For example, the computing device 170 can serve a webpage including lot-specific and/or non-lot-specific product data to the communication device 160, where the webpage further asks the requestor to input a location such as a zip code, city and state, a street address, by selecting a store from an interactive map, or the like. Alternatively, the webpage provides lot-specific and/or non-lot-specific product data to the communication device 160 and further includes a link to another webpage that provides the requestor the opportunity to submit a quality assessment, where one of the questions asks for location information.

In addition to providing lot-specific product data to the communication device 200 and receiving traceability codes 145 and location information therefrom, the computing device 170 can additionally solicit and receive quality assessments and other information from the requestor. The computing device 170 can serve a webpage to the communication device 160 that, for example, provides a grading scale as noted previously. Other questions asked of the requestor can be unrelated to the perishable product 140 bearing the scanned traceability code 145, such as questions about shopping habits. Which attributes amongst the lot-specific product data that is actually provided to the requestor by the computing device 170 can depend on a permission of the requestor, as described in U.S. patent application Ser. No. 12/877,467. Similarly, the questions put to the requestor can depend on the identity of the requestor. For example, different questions can be provided to a requestor at a kiosk, or using a mobile device, or using a hand-held scanner, or using a PC.

The computing device 170 stores the traceability code 145 in association with the location information, time, and any quality assessments or other information from the requestor in a computer-readable memory device 180. In some embodiments, the computer-readable memory device 180 is the same as the computer-readable memory device 150, while in other embodiments the two are separate from one another.

A computing system 190 can access the computer-readable memory device 180 to retrieve stored location, time, and any other associated information. The location and time of a scan of a traceability code 145 can be compared against the origin for that traceability code 145 to determine the elapsed time from the origin to the time of the scan and/or the traversed distance from the origin to the location of the scan. In some embodiments the computing system 170 copies the origin and other lot-specific product data over to the computer-readable memory device 180 from the computer-readable memory device 150. In other embodiments, the computing system 190 directly accesses the computer-readable memory device 150 to retrieve lot-specific product data.

Figure 4:
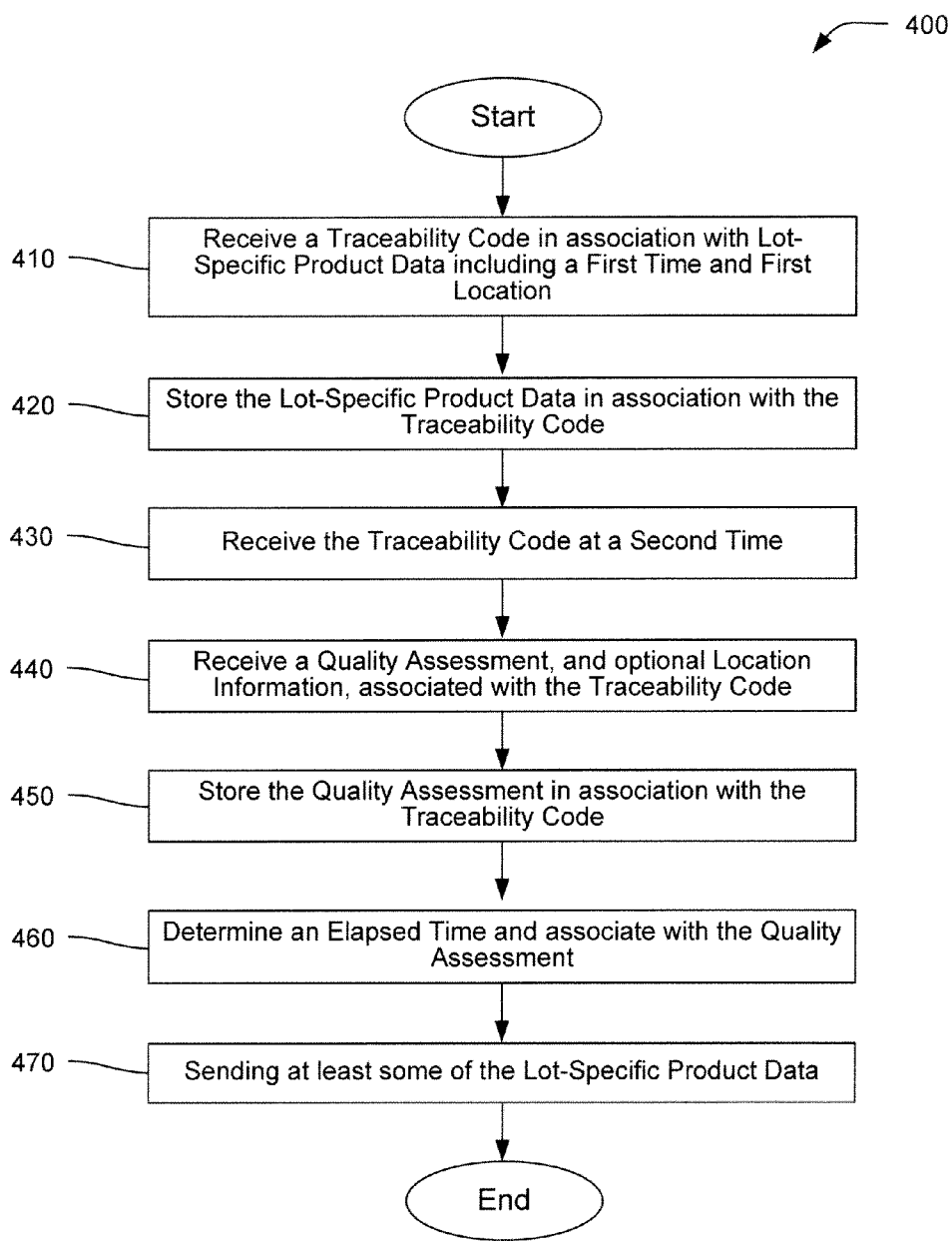
FIG. 4 is a flowchart representation of a method for linking quality assessments of perishable products back to lot-specific product data according to an exemplary embodiment of the present invention.

FIG. 4 shows a flowchart representation of an exemplary method 400 for linking quality assessments of perishable products 140 back to lot-specific product data. The method 400 can be performed, for example, by one or more computing devices such as computing devices 120, 170, 190 in communication with one or more databases maintained in one or more computer-readable memory devices such as computer-readable memory devices 150, 180. These computing devices can be in further communication with a plurality of different producers of various perishable products 140. These computing devices can also be accessed by individuals along the distribution chain as well as by those who can benefit from the correlations of the quality assessments back to lot-specific product data.

The method 400 comprises a step 410 of receiving a traceability code 145 in association with lot-specific product data including a first time and a first location. The traceability code 145 and associated lot-specific product data is received from a producer of perishable products 140 across a network 130 by a first computing system 120, in some embodiments. Step 410 is repeated for each new traceability code 145 that is generated by the producer. In some instances, more than one traceability code 145 can be associated with the same lot-specific product data. The lot-specific product data can include both consumer-oriented and producer-oriented lot-specific product data. In those instances where the first computing system 120 is configured to receive traceability codes 145 and lot-specific product data from more than one producer, the traceability codes 145 either uniquely identify the producer, else are identified to the producer in another manner. For example, the communication channel to the producer can be dedicated to that producer, or the traceability codes 145 and lot-specific product data can be received in further association with a unique identifier for the producer.

In a step 420, the lot-specific product data is stored in association with the traceability code, for instance, in a computer-readable memory device 150. As stored, the lot-specific product data can comprise a record in a database that is identified by the traceability code 145. By repeating steps 410 and 420, a collection of lot-specific product data across multiple lots of perishable product 140 for each producer can be established.

In a step 430, a traceability code 145 is received at a second time that is after the first time previously associated with that traceability code 145. The step 430 can be performed by the same or different computing system than the one that received the traceability code 145 and lot-specific product data in step 410. In some embodiments, the step 430 is performed by computing system 170 which may be a web server having a publicly accessible URL. In step 430 the received traceability code 145 is not necessarily associated with the second time until receipt, thus the step 430 also includes associating the second time with the traceability code 145. The step 430 is performed, for example, when a consumer submits the traceability code 145 from a home PC or smartphone through the publically accessible website. In other instances, an inspector can upload multiple traceability codes 145, each already associated with a time, as discussed below in connection with method 500 of FIG. 5.

In a step 440 a quality assessment associated with the traceability code 145 is also received contemporaneously by the same computing device that performed step 430. In various embodiments the two are received together, such as in a single communication received from an inspector using a communication device such as device 300. In other situations the traceability code 145 is received in a first communication, and the quality assessment is received in a second communication. In these embodiments, the step 440 can include accessing a record associated with the traceability code 145 to determine non-lot-specific product data, such as a UPC code, that identifies the type of perishable product 140 in question, then sending a grading scale for that type of perishable product 140. In response to sending the grading scale the quality assessment is received and associated with the traceability code 145. As used herein, "contemporaneously" is defined to mean within a period of connectivity between the receiving computing system and the communication device 160.

Step 440 optionally includes receiving location information contemporaneously with the quality assessment. It will be appreciated that although the location information can be valuable to later analyses, it is not essential. Location information can be received together with the traceability code 145 and quality assessment, or can be received in a separate communication from the communication that transmitted the traceability code 145. In some embodiments, receiving the location information includes prompting the requestor to provide the location information after receiving the traceability code 145.

In a step 450 the quality assessment is stored in association with the traceability code 145, for example, in a computer-readable memory device which may be the same or a different computer-readable memory device than used in step 420. Optionally, the second time and the location information is also stored in association with the traceability code 145.

In a step 460 an elapsed time between the second time and the first time is determined and associated with the quality assessment. Step 460 can also comprise storing the elapsed time in associated with the quality assessment and the traceability code. In those embodiments of the method 400 in which location information is received, step 460 can also comprise determining a traversed distance. Determining the traversed distance may in turn include deriving a second location from the location information. For example, where the location information identifies a particular store or kiosk, deriving the second location can comprise finding the location associated with the location information, such as finding the street address associated with a kiosk identifier.

In a step 470, at least some of the lot-specific product data is optionally sent in response to receiving the traceability code at the second time. As noted above, the portion of the lot-specific product data that is sent can depend on permissions of the requestor which optionally can be received in the step 430 along with receiving the traceability code at the second time, in some embodiments. Lack of a permission may be used in some embodiments to signify that the requestor is a member of the public and in these embodiments only consumer-oriented lot-specific product data is sent in step 470. In various embodiments step 470 precedes step 440 of receiving the quality assessment. For example, the lot-specific product data can be sent in response to receiving the traceability code in step 430 and can be sent with a grading scale to be used to generate the quality assessment.

Figure 5:
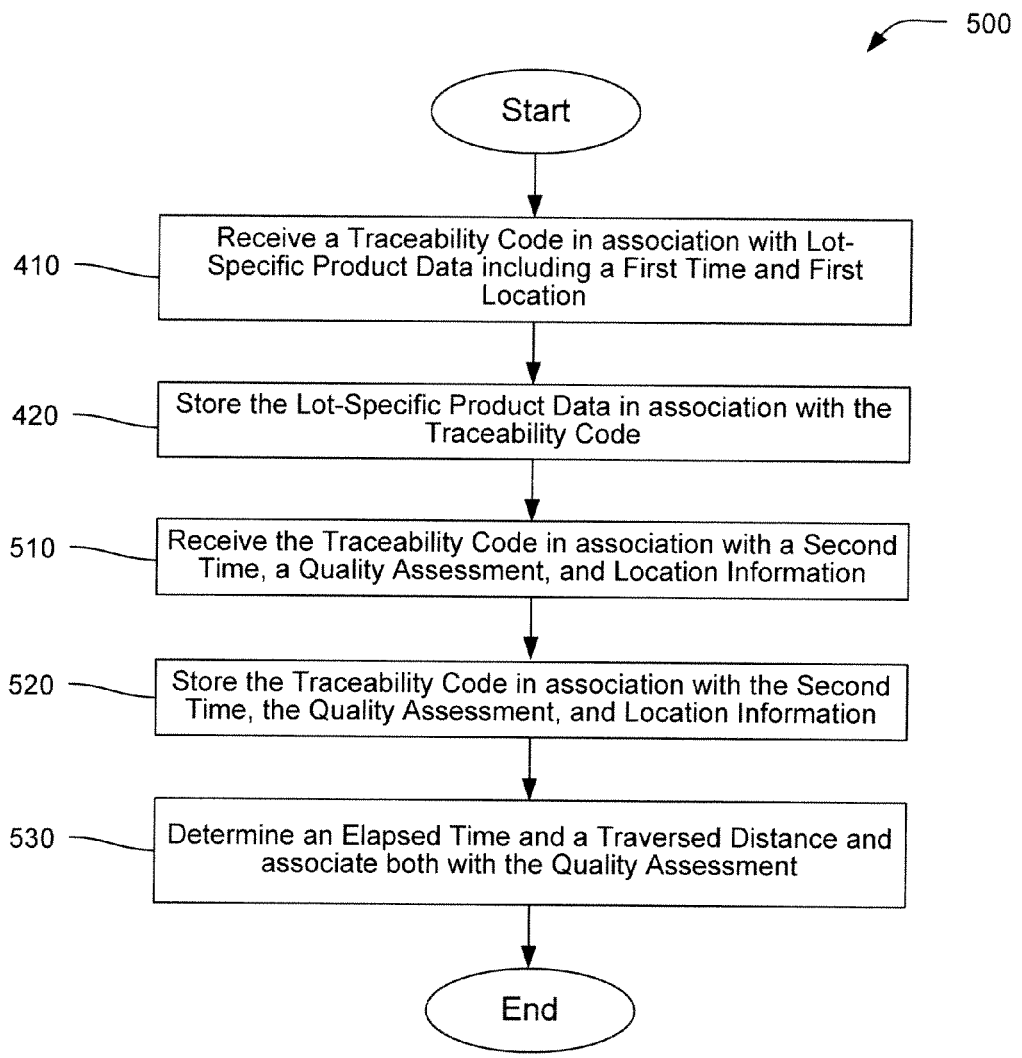
FIG. 5 is a flowchart representation of a method for linking quality assessments of perishable products back to lot-specific product data according to another exemplary embodiment of the present invention.

FIG. 5 shows a flowchart representation of another exemplary method 500 for linking quality assessments of perishable products 140 back to lot-specific product data. The method 500 can be performed, for example, by one or more computing devices such as computing devices 120, 170, 190 in communication with one or more databases maintained in one or more computer-readable memory devices such as computer-readable memory devices 150, 180. These computing devices can be in further communication with a plurality of different producers of various perishable products 140. These computing devices can also be accessed by individuals along the distribution chain as well as by those who can benefit from the correlations of the quality assessments back to lot-specific product data.

The method 500 includes steps 410 and 420 as described above with respect to the method 400. The method 500 additionally comprises a step 510 of receiving the traceability code in association with a second time, a quality assessment, and location information. Step 510 can be performed, for example, after traceability codes 145 are scanned and associated with time, location information, and quality assessments without real-time connectivity, such as with device 300, and later uploaded to computing device 170. In a step 520, analogous to step 450 of method 400, the traceability code is stored in association with the second time, the quality assessment, and location information. In a step 530, analogous to step 460 of method 400, an elapsed time and a traversed distance are determined and associate both with the quality assessment.

Repeatedly performing either or both methods 400 and 500 can yield a large dataset of quality assessments for a given perishable product 140 of a particular producer that are associated with lot-specific product data, elapsed times, and optionally associated with traversed distances. One way to increase the size of the dataset in order to increase the statistical significance of results obtained therefrom is to send multiple inspectors into retail stores, for example, to scan and grade perishable products 145. This can be done daily, in some instances. Using inspectors in this way also avoids possible selection bias by consumers to preferentially complain about very poor quality and/or to highlight exceptional quality, while being indifferent to average quality.

Figure 6:
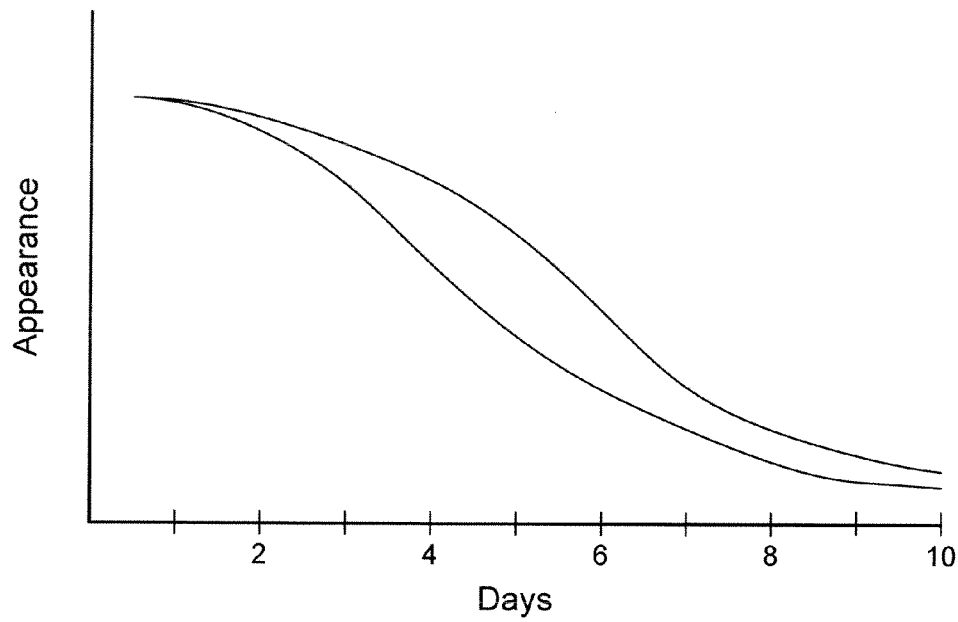
FIG. 6 is an exemplary graph of product appearance as a function of elapsed time and as a further function of a lot-specific product data.
Figure 7:
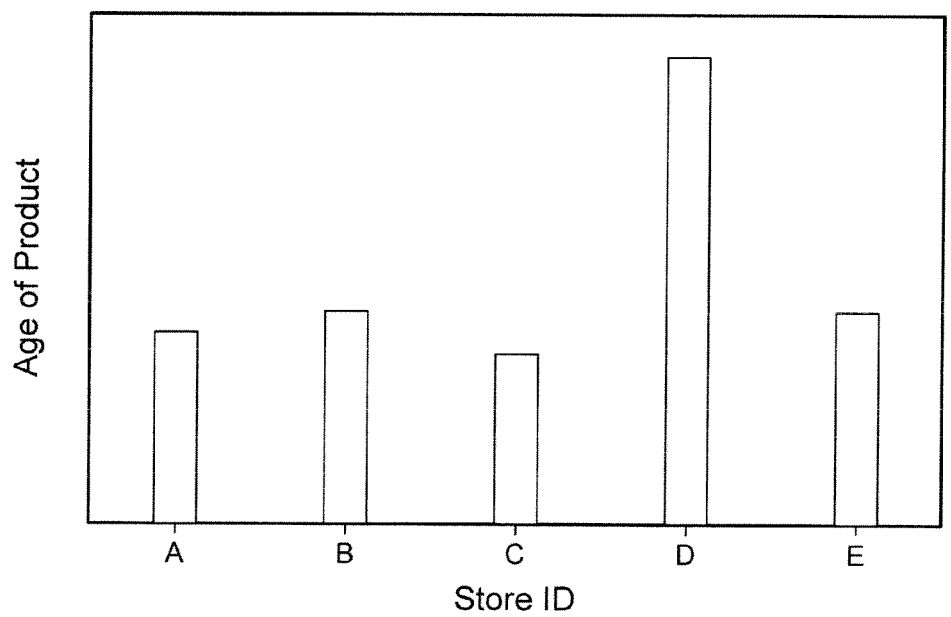
FIG. 7 is an exemplary graph of product age as a function of retail store identification.

FIGS. 6 and 7 illustrate two exemplary ways that the same dataset can be used by producers and retailers, respectively. FIG. 6 shows a graph of appearance of a perishable product 140 as a function of time and as a further function of a lot-specific product data. The two lines can represent two different varietals of a berry, for example, and shows that although both varietals are graded as having about the same appearance initially, one out-performs the other over longer time periods. Producers can similarly evaluate changes in any of the other variables that are stored. While the above disclosure has focused on associating together lot-specific product data, traversed distances, elapsed times, and quality assessments, other variables can become part of the dataset as well. For example, the day of the week that the quality assessment was made is not lot-specific, but can also be determined from the time associated with reading the traceablity code.

FIG. 7 shows a graph of the average age of a perishable product 140 as compared between several stores for a specific retailer, showing that one store consistently receives older product than the other stores, or does not rotate stock properly, for example.

Logic described herein can comprise, for example, hardware, such as application-specific integrated circuits (ASICs), specifically designed to perform the particular described functions. Logic can also comprise firmware residing, for instance, in read only memory (ROM) or flash memory, where the firmware is programmed to perform the particular described functions. Logic can also comprise a microprocessor capable of executing software residing in a memory, for example, in random access memory (RAM), where the computer instructions embodied in the software, when executed by the microprocessor perform the particular described functions. Any combination of two or more of hardware, firmware, and software can also comprise logic. Hardware, firmware, and/or software can be embodied in hand-held devices such as smartphones running third-party applications, for example. Logic comprising ardware, firmware, and/or software can also be embodied in various types of computing systems such as servers and personal computers. It will be appreciated that such computing systems, when configured to follow specific logic embodied in their circuits or programming instructions, or both, constitute specific machines.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
receiving, with a first computing system, a traceability code in association with lot-specific product data including a first time and a first location;
storing the lot-specific product data in association with the traceability code in a computer-readable memory device;
receiving the traceability code at a second time and in response accessing a record associated with the traceability code to determine non-lot-specific product data that identifies a type of perishable product;
sending a grading scale for the type of perishable product after accessing the record associated with the traceability code;
receiving location information and a quality assessment about a product contemporaneously with receiving the traceability code;
storing the quality assessment in association with the traceability code;
determining, with a second computing system, an elapsed time between the second time and the first time and associating the elapsed time with the quality assessment;
determining a traversed distance between the first location and a second location derived from the location information, wherein the location information and the quality assessment are received from a communication device; and
wherein the traceability code, location information, and the quality assessment are all received within a period of connectivity between the second computing system and the communication device.

2. The method of claim 1 wherein the step of receiving the traceability code at the second time is performed with the second computing system.

3. The method of claim 1 further comprising storing a second location, derived from the location information, in association with the quality assessment and the traceability code.

4. The method of claim 1 further comprising sending at least some of the lot-specific product data in response to receiving the traceability code at the second time.

* * * * *